United States Patent
Benito-Navazo

(10) Patent No.: US 7,348,488 B2
(45) Date of Patent: Mar. 25, 2008

(54) RACEWAY FOR ELECTRICAL CABLES

(75) Inventor: Juan Manuel Benito-Navazo, Barcelona (ES)

(73) Assignee: Unex Aparellaje Electrico S.L., Barcelona (ES)

( * ) Notice: Subject to any disclaimer, the term of this patent is extended or adjusted under 35 U.S.C. 154(b) by 0 days.

(21) Appl. No.: 11/515,943

(22) Filed: Sep. 6, 2006

(65) Prior Publication Data

US 2007/0062732 A1    Mar. 22, 2007

(30) Foreign Application Priority Data

Sep. 19, 2005   (ES)   ................................ 200502272

(51) Int. Cl.
*H02G 3/04*   (2006.01)
(52) U.S. Cl. ................. 174/72 A; 174/68.1; 174/71 R; 174/95; 248/68.1; 52/220.7
(58) Field of Classification Search .............. 174/72 A, 174/68.1, 68.3, 48, 71 R, 72 R, 95–97, 137; 248/49.681, 65; 439/211, 207; 52/220.7 385/100, 134
See application file for complete search history.

(56) References Cited

U.S. PATENT DOCUMENTS

| | | | | |
|---|---|---|---|---|
| 3,890,459 A | | 6/1975 | Caveney | |
| 4,484,020 A | * | 11/1984 | Loof et al. | 174/68.3 |
| 5,918,837 A | * | 7/1999 | Vicain | 248/49 |
| 6,140,584 A | * | 10/2000 | Baldissara | 174/68.3 |
| 6,444,903 B2 | * | 9/2002 | Saeki et al. | 174/480 |
| 6,603,073 B2 | * | 8/2003 | Ferris | 174/68.3 |

FOREIGN PATENT DOCUMENTS

| | | |
|---|---|---|
| ES | 265109 | 5/1982 |
| ES | 2 250 012 | 4/2006 |
| WO | 99/52189 | 10/1999 |

* cited by examiner

*Primary Examiner*—Dhiru R. Patel
(74) *Attorney, Agent, or Firm*—Staas & Halsey, LLP

(57) ABSTRACT

Raceway for electrical cables having a channel-shaped base element made up of a flat bottom wall, and two side walls which form with the flat bottom wall respective blunt edges and which have a plurality of narrow cut-outs that are parallel and extend perpendicular to the flat bottom wall, and a series of slits arranged between the flat bottom wall and the narrow cut-outs. Each slit extends as far as the flat bottom wall, completely sectioning the blunt edge that the flat bottom wall forms with the side wall. The flat bottom wall is provided with a weakening line extending parallel to the blunt edge. The raceway allows a cable to be deviated through one of the side walls without having to deviate the cable vertically, by breaking away one of vertical flanges defined between the two narrow cut-outs.

5 Claims, 1 Drawing Sheet

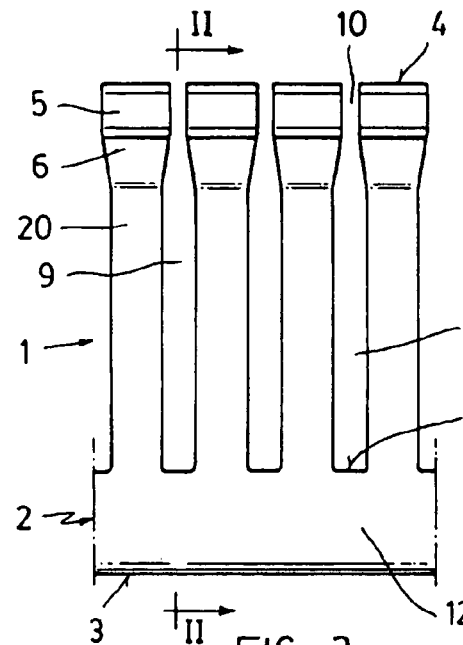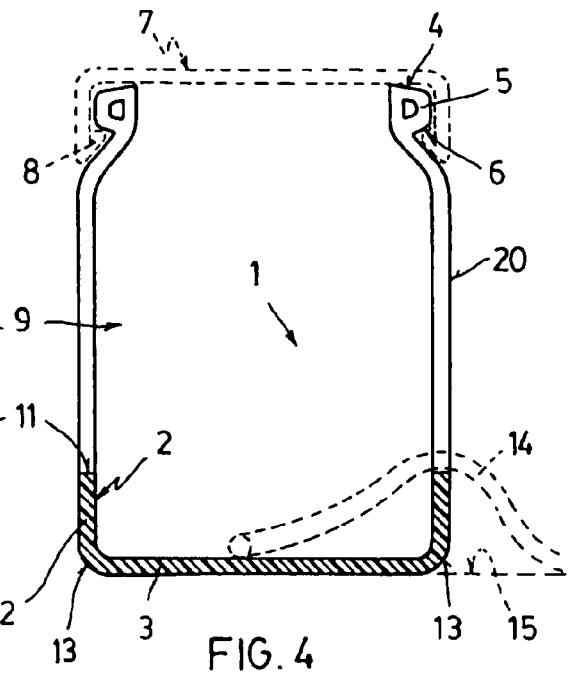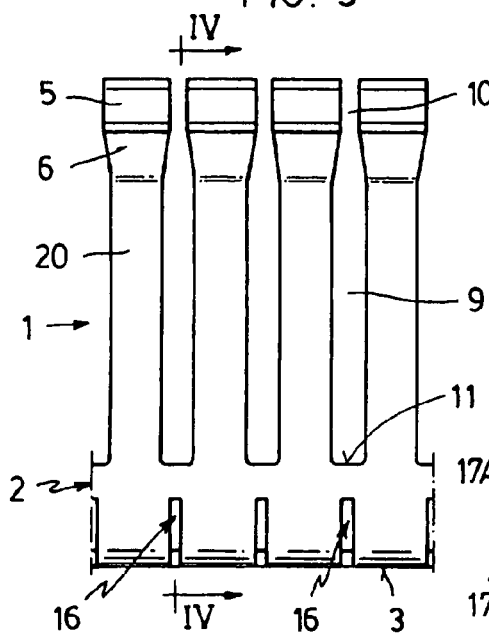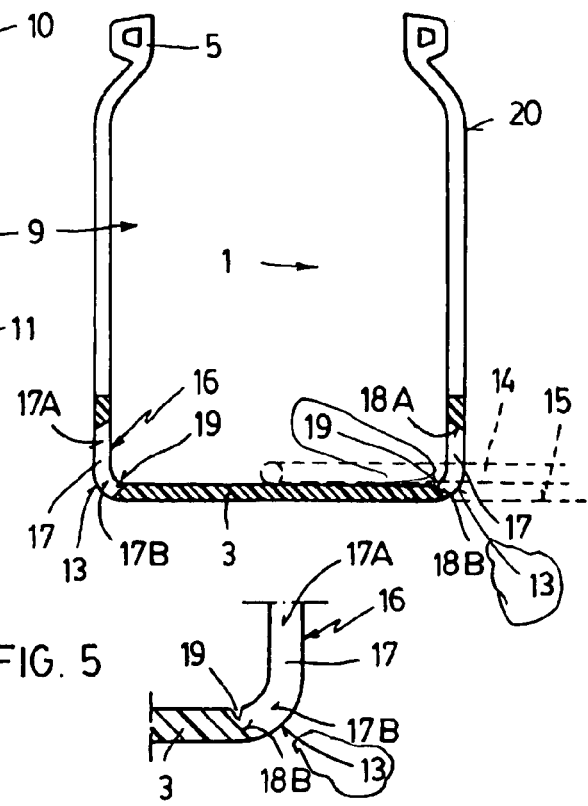
FIG. 1 (Prior art)
FIG. 2 (Prior art)
FIG. 3
FIG. 4
FIG. 5

RACEWAY FOR ELECTRICAL CABLES

FIELD OF THE INVENTION

This invention relates to a raceway for electrical cables, of the type enabling any of the electrical cables it houses to be deviated at any point along its length and through at least one of its side walls.

More particularly, the invention relates to a raceway of the type made up of a channel-shaped base element associated with a flattened closing element which is applied in a removable fashion to the top face of said channel-shaped base element, said channel-shaped base element being made of a flat bottom wall and two side walls that are parallel to one another and joined perpendicular to said flat bottom wall forming therewith respective blunt edges, said side walls having a series of narrow cut-outs that are equidistant and parallel to one another extending perpendicular to said flat bottom wall, between a closed lower end separated from said flat bottom wall and an open upper end on the free edge of the side wall, at least one of said side walls having a series of slits arranged between said flat bottom wall and the closed lower ends of said narrow cut-outs, each of said slits being aligned with one of said narrow cut-outs perpendicular to said flat bottom wall.

STATE OF THE ART

Raceways for electrical cables of the type indicated at the beginning are known, wherein one of the electrical cables housed in the raceway is deviated sideways by passing said electrical cable through one of the cut-outs in the side walls. In these known raceways the cut-outs are separate from the bottom wall of the raceway, so that the lower part of the side walls forms a longitudinal border which protects the electrical cables running along the bottom wall of the raceway. This known arrangement suffers from the drawback that when an electrical cable is deviated sideways by passing it through one of said cut-outs, said cable has to be deviated vertically to overcome the distance between the bottom wall of the raceway and the lower end of the cut-out, and it rests with a certain stress on said lower end of the cut-out. This makes it difficult for a user to deviate the electrical cable sideways and, it also gives rise to the risk that, with time, said electrical cable would be damaged as a result of the contact with stress on the lower end of the cut-out. An example of this type of known raceways is disclosed in Spanish Utility Model No. ES265109U in the name of the applicant, which relates to a basic raceway not including the said slits located between the bottom wall and the lower ends of the cut-outs, as well as International PCT application No. WO9952189, wherein the raceway does include said slits. In the raceway disclosed in document WO9925189 the purpose of the slits is to make it easier to cut the raceway in order to adjust it to the utility length required and also to allow a transversal raceway to be attached.

DISCLOSURE OF THE INVENTION

The purpose of the invention is to provide a raceway for electrical cables of the type indicated at the beginning, which enables one or several of the electrical cables housed in the raceway to be deviated sideways at any point along its length without having to deviate said electrical cable vertically in order to pass it through one of the cut-outs in the side walls.

This purpose is achieved by means of a raceway for electrical cables of the type indicated at the beginning, characterised in that each of the slits located between the flat bottom wall and the closed lower ends of the narrow cut-outs extend as far as said flat bottom wall, completely sectioning the blunt end formed by the junction between the side walls and said flat bottom wall, and in that at least one weakening line is provided in said flat bottom wall which extends parallel to said blunt edge next to the lower ends of said slits.

The raceway according to the invention allows an electrical cable to be deviated sideways in a different, easier and more robust way than in the state of the art raceways. In fact, in order to deviate a cable at any point along the length of a raceway through one of the side walls, one of the vertical flanges defined between two narrow cut-outs is completely removed. To this end, the side wall is cut between each narrow cut-out and the slit arranged between the cut-out and the flat bottom wall, whereby the vertical flange remains joined to the side wall only by means of a blunt edge that joins it to the flat bottom wall. By virtue of this arrangement, it is easy to subsequently remove said vertical flange, which is separated from the flat bottom wall along the weakening line, whereby a corresponding opening is formed in the side wall the lower end of which lies flush with the flat bottom wall. Therefore the electrical cable can be deviated sideways by passing it through said opening on level with the flat bottom wall, without having to deviate it vertically.

Preferably, each of said slits has two larger edges that are opposite and perpendicular to said flat bottom wall and two smaller edges opposite and transverse to said larger edges, each of said larger edges being formed by a straight portion, corresponding to the section of said side wall, and a curvilinear portion, corresponding to the section of said blunt edge, and the lower one of said smaller edges, in other words the one which is on level with said flat bottom wall, having an inclined section which forms an obtuse angle with the lower face of said flat bottom wall.

Preferably, said weakening line is a longitudinal groove or slight notch extending next to said lower smaller edge of the slits.

Preferably, the top of said smaller edges of the slit, in other words the part opposite said blunt edge, has the same inclined section as said lower smaller edge, so that said upper and lower smaller edges have a parallel section.

BRIEF DESCRIPTION OF THE DRAWINGS

To facilitate the understanding of the preceding ideas, a preferred embodiment of the invention is described below, with reference to the attached illustrative drawings, in which:

FIGS. 1 and 2 show a conventional raceway for electrical cables, in other words corresponding to the preceding state of the art. FIG. 1 is a side view of a part of the channel-shaped base element of said conventional raceway. FIG. 2 is a cross section along line II-II in FIG. 1, also illustrating in dotted lines the flattened closing element that covers the channel-shaped base element at the open top face thereof.

FIG. 3 is a side view, similar to that in FIG. 1, of a raceway for electrical cables according to the invention.

FIG. 4 is a cross section along line IV-IV in FIG. 3.

FIG. 5 shows, on an enlarged scale, the detail of the encircled area in FIG. 4.

DETAILED DESCRIPTION OF AN EMBODIMENT OF THE INVENTION

FIGS. 1 and 2 show, in two orthogonally-located positions, a fragment of the channel-shaped base element 1 of a known raceway corresponding to the state of the art, made by extruding a channel-shaped body from synthetic plastics made up of two vertical walls 2 and a flat bottom wall 3. Said vertical walls 2, on the free edge thereof 4, have a hollow bead 5 forming a socket 6 for a flattened closing element 7, shown in dotted lines in FIG. 2, provided with ribs 8 complementing the sockets 6 of the channel-shaped base element 1 which allow the mutual coupling in an openable manner of both elements in their closing position. Said vertical walls 2 are manipulated after their extrusion, using a die-cutting method or other technically suitable process, to shape a series of narrow cut-outs 9 having an open top end 10 on the free edge 4 of side wall 2 and a closed lower edge 11 at a distance from the flat bottom wall 3, forming a longitudinal border 12. It is observed that vertical walls 2 are intersected with flat bottom wall 3 forming a blunt edge 13.

As can be seen in FIG. 2, one of the electrical cables 14 housed in raceway 1 is deviated sideways by passing it through one of the narrow cut-outs 9, so that it must be deviated vertically over the longitudinal border 12 and return to a seating plane 15 outside the raceway, resting on the closed lower end 11 of cut-out 9 and exposed to damage from the edge of said end 11.

FIGS. 3, 4 and 5 show a raceway for electrical cables according to the invention. The channel-shaped base element 1 has, on its side walls 2, a series of slits 16 arranged so that they are all aligned with the axis of symmetry of narrow cut-outs 9, as shown in particularly in FIG. 3. Slits 16, as can be seen in FIGS. 4 and 5, and detailed in the latter, have two larger edges 17, each formed by a straight portion 17A followed by a curvilinear portion 17B, and two upper and lower smaller edges 18A and 18B. The upper and lower smaller edges 18A and 18B have their surface inclined in the same direction forming an obtuse angle with the inner face of flat bottom wall 3. On level with lower smaller edge 18B and on the top face of flat bottom wall 3 weakening lines, e.g., slight longitudinal grooves 19, have been provided which extend next to lower smaller edges 18B of slits 16. Said longitudinal grooves 19 as weakening lines make it easier to break, on level with flat bottom wall 3, the vertical flanges 20 formed between narrow cut-outs 9.

In FIG. 4 it can be seen how the raceway according to the invention allows electrical cable 14 to be deviated without having to overcome any obstacle to sit on an outside plane 15 on which raceway 1 lies. To this end, one of vertical flanges 20 is broken away to form a corresponding opening, the lower end of which is flush with flat bottom wall 3, so that it is possible to extract electrical cable 14 through said opening. That is, vertical flange 20 is broken by previously cutting side wall 2 between each narrow cut-out 9 and slit 16 aligned therewith, whereby vertical flange 20 remains joined to side wall 2 only by means of blunt edge 13, and then said vertical flange 20 is broken along said longitudinal groove 19.

It must be observed that the slight height difference between the top face of flat bottom wall 3 and seating plane 15 can be overcome, without any danger, by electrical cable 14, on which only the edge of lower smaller edge 18B can act, forming a mechanically inoffensive, obtuse dihedral angle.

The invention claimed is:

1. Raceway for electrical cables, comprising: a channel-shaped base element including a flat bottom wall and two side walls that are substantially parallel to one another, intersect substantially perpendicular to said flat bottom wall and form, with the bottom wall, respective blunt edges, said side walls having a plurality of narrow cut-outs substantially equidistant and substantially parallel to one another extending substantially perpendicular to said flat bottom wall between a closed lower end separated from said flat bottom wall and an open top end on a free edge of each side wall, wherein at least one of said side walls has a series of slits arranged between said flat bottom wall and the closed lower ends of said narrow cut-outs, each of said slits being aligned with one of said narrow cut-outs in a direction perpendicular to said flat bottom wall, wherein each of said slits extends as far as said flat bottom wall, sectioning said blunt edge, and wherein in said flat bottom wall there is provided at least one weakening line which extends parallel to said blunt edge next to lower ends of said slits.

2. Raceway for electrical cables according to claim 1, wherein each of said slits has two larger edges opposite and substantially perpendicular to said flat bottom wall and two smaller edges opposite and substantially transverse to said larger edges, each of said larger edges being formed by a straight portion, corresponding to a section of said side wall, and a curvilinear portion, corresponding to a section of said blunt edge, and a bottom one of said smaller edges, level with said flat bottom wall, has an inclined section forming an obtuse angle with an inner face of said flat bottom wall.

3. Raceway for electrical cables according to claim 2, wherein said weakening line is a longitudinal groove extending next to said bottom smaller edge of the slits.

4. Raceway for electrical cables according to claim 3, wherein a top one of said smaller edges of the slit lying opposite said blunt edge has a same inclined section of said bottom smaller edge, such that said top and lower smaller edges have parallel sections.

5. Raceway for electrical cables according to claim 2, wherein a top one of said smaller edges of the slit lying opposite said blunt edge has a same inclined section of said bottom smaller edge, such that said top and lower smaller edges have parallel sections.

* * * * *